United States Patent [19]

Yamamoto et al.

[11] Patent Number: 4,702,872
[45] Date of Patent: Oct. 27, 1987

[54] METHOD FOR MANUFACTURE OF FIBER REINFORCED THERMOSETTING RESIN MOLDING MATERIAL

[75] Inventors: Shigehiro Yamamoto, Matsubara; Terukuni Hashimoto, Itami; Mitsuo Kobayashi, Osaka; Tsugishige Iwaki, Takatsuki; Katsushige Tamura, Akashi; Hideo Saijo, Suita, all of Japan

[73] Assignee: Nippon Shokubai Kagaku Kogyo Co., Ltd., Japan

[21] Appl. No.: 727,520

[22] Filed: Apr. 26, 1985

[30] Foreign Application Priority Data

Oct. 9, 1984 [JP] Japan .................. 59-210511

[51] Int. Cl.[4] .............................................. B05D 1/28
[52] U.S. Cl. .................................... 264/114; 118/303; 118/DIG. 16; 239/7; 427/196; 427/426
[58] Field of Search .............. 156/62.4; 264/109, 114, 264/115, 116, 121, 131, 134; 118/DIG. 16, 303, 300, 323; 425/82.1, 83.1; 427/426, 196; 65/3.4, 3.43, 344; 239/7.2 N, 119, 220

[56] References Cited

U.S. PATENT DOCUMENTS

| | | | |
|---|---|---|---|
| 2,493,194 | 1/1950 | Heino | 425/83.1 |
| 3,008,407 | 11/1961 | Roberts et al. | 239/220 |
| 3,061,150 | 10/1962 | Lindquist | 118/308 |
| 3,873,025 | 3/1975 | Quarnstrom | 118/300 |
| 3,932,980 | 1/1976 | Mitzutani et al. | 53/111 |
| 4,204,644 | 3/1980 | Kozuka | 239/220 |
| 4,421,055 | 12/1983 | Arthur et al. | 118/DIG. 16 |

Primary Examiner—Michael Ball
Attorney, Agent, or Firm—Omri M. Behr

[57] ABSTRACT

A method for the manufacture of a fiber reinforced thermosetting resin molding material, which comprises feeding a liquid thermosetting resin composition to the surface of at least one transfer roller in rotation, causing the resin composition adhering to the surface to be spread in the form of particles by a spreading roller opposed across a gap to the transfer roller and rotated in the same direction as the transfer roller, allowing the spread said resin composition to be piled up in a state mixed with reinforcing fibers separately spread, and subsequently removing the entrapped air from the resultant pile thereby enabling the resin composition to wet out the reinforcing fibers in said pile.

11 Claims, 9 Drawing Figures

METHOD FOR MANUFACTURE OF FIBER REINFORCED THERMOSETTING RESIN MOLDING MATERIAL

BACKGROUND OF THE INVENTION

1. Field of the Invention:

This invention relates to a method for the manufacture of a fiber reinforced thermosetting resin molding material. More particularly, this invention relates to a method for the manufacture of a fiber reinforced thermosetting resin molding material having a thermosetting resin composition and reinforcing fibers dispersed in and mixed with each other without exertion of any immoderate force and having the reinforcing fibers satisfactorily wetted out with the thermosetting resin composition without infliction of any breakage.

2. Description of the Prior Art:

Generally, the fiber reinforced thermosetting resin molding material for hot pressing or injecting is obtained by combining the thermosetting resin liquid such as unsaturated polyester resin with additives such as fillers, mold release agents, thickening agents, and coloring agent thereby producing a viscous liquid resin composition and mixing this resin composition with reinforcing fibers such as glass fibers thereby enabling the fibers to be wetted out with the resin composition. At the time of molding, therefore, the molding material so produced is tack free enough to ensure ease of handling. Heretofore, the sheet molding compound (SMC) supplied in the form of sheet and the bulk molding compound (BMC) supplied in bulk have been mainly used. As compared with the SMC process which causes a liquid composition of relatively low viscosity and reinforcing fibers to be mixed with each other and thereby enables the reinforcing fibers to be wetted out with the resin composition, the BMC process generally involves wet out with a resin composition incorporating a large amount of filler and exhibiting high viscosity and, therefore, has no alternative but to use a powerful stirrer such as a kneader in attaining satisfactory mixture of the liquid resin composition with the reinforcing fibers and consequent wet out of the reinforcing fibers with the resin composition.

In accordance with the conventional BMC process, the staple cutting length of reinforcing fibers for use in the molding material is short, falling on the order of ½ inch to ¼ inch. Moreover, this process has the disadvantage that the reinforcing fibers, while being kneaded with the resin composition, eventually reach the point of sustaining breakage under the shearing force generated because of the stir by a kneader and the shaped article produced by using the consequently obtained molding material suffers from insufficient strength. As the molding material of required consistency is produced in consequence of the stirring by the kneader, it is removed from the stirring tank by the use of an extruder, wide difference of strength occurs between the portion of the material removed during the first half of the whole duration of removal of one lot of producted material and the portion removed during the latter half of the duration. From the standpoint of quality control, therefore, the conventional BMC process possesses the drawback that the molding material obtained in one lot has its strength heavily dispersed from one part to another.

In the conventional SMC process, reinforcing fibers are spread between layers of liquid resin composition applied one each on two opposed polyethylene films and the layer of the reinforcing fibers as nipped between the layers of liquid resin composition is pressed with a roller so as to cause wet out of the reinforcing fibers with the resin composition. The sheet molding material produced by any method of this principle, therefore, has a thickness generally on the order of 2 to 3 mm at most. By simply increasing the amount of the resin composition to be applied and the amount of the fibers to be spread, the molding sheet material of increased thickness cannot be obtained with high productivity.

As a means of enabling reinforcing fibers to be most easily mixed and wetted out with a resin composition without entailing infliction of breakage, the method which comprises applying the resin composition on a pair of rollers and nipping a layer of chopped glass fibers between the aforementioned rollers thereby causing the glass fibers to be impregnated with the resin composition by virtue of the pressure exerted by the opposed rollers upon the layer of glass fibers has been known to the art (U.S. Pat. No. 3,932,980). Since this method causes the aggregate of glass fibers to be wetted with the resin composition of high viscosity by virtue of the pressure of the opposed rollers, it is basically indentical with the SMC process and enables the wet out to proceed only to a limited extent. Particularly when the resin composition so used has high viscosity and the glass fibers' content in the produced molding material is high, it is extremely difficult for the resin composition to provide proper wet out of the glass fibers. Further the impregnation is not obtained sufficiently because it is instantaneously effected solely by the linear pressure generated while the resin composition and the glass fibers are passing between the opposed rollers. The glass fibers are injured because they are exposed instantaneously to the excessive force. The mixture of glass fibers and resin composition emerging from the pair of nip rollers is scraped off these nip rollers with a rotary roller. Since this rotary roller is operated at a high speed, the glass fibers in the scrapped mixture are liable to be disentangled and the shaped article produced by using the mixture is liable to suffer from degradation of strength. A more important thing is the fact that this method has low productivity. The combined amount of the resin composition and the glass fibers to be passed between the paired nip rollers per unit time and the speed of their passage have their limits. When the rotational speed of the rotary rollers is increased for the purpose of increasing the productivity, the wet out is not obtained to a sufficient extent. This method, therefore, has the drawback of possessing limited productivity.

As a means of solving problems of this nature, the spray method is known which enables chopped glass fibers to be mixed and blended most effectively with a resin composition. In accordance with the spray method, however, the highest viscosity the resin composition is tolerated to possess in order to be effectively divided into fine particles by spraying is only on the order of 20 to 30 poises. The highest viscosity the resin composition is tolerated to possess to be effectively divided into coarse particles by spraying is only on the order of 100 poises.

In contrast, the liquid resin composition generally used for BMC has viscosity in the range of 1,000 to 10,000 poises. Thus, the resin composition cannot be supplied by the spray method to the glass fibers.

An object of this invention, therefore, is to provide a novel method for the manufacture of a fiber reinforced thermosetting resin molding material.

Another object of this invention is to provide a novel method for the manufacture of a resin reinforced thermosetting resin molding material having a thermosetting resin composition and reinforcing fibers dispersed in and mixed with each other without exertion of any immoderate force and having the reinforcing fibers satisfactorily wetted out with the thermosetting resin composition without infliction of any breakage.

SUMMARY OF THE INVENTION

The objects described above are attained by a method for the manufacture of a fiber reinforced thermosetting resin composition molding material, which comprises feeding a liquid thermosetting resin composition to the surface of at least one transfer roller in rotation, causing the resin composition adhering to the surface to be spread in the form of particles by a spreading roller opposed across a gap to the transfer roller and rotated in the same direction as the transfer roller, allowing the spread resin composition to be piled up in a state mixed with reinforcing fibers separately spread, and subsequently removing the entrapped air from the resultant pile thereby enabling the resin composition to wet out the reinforcing the fibers in the pile.

DESCRIPTION OF THE PREFERRED EMBODIMENT

Figure 1:
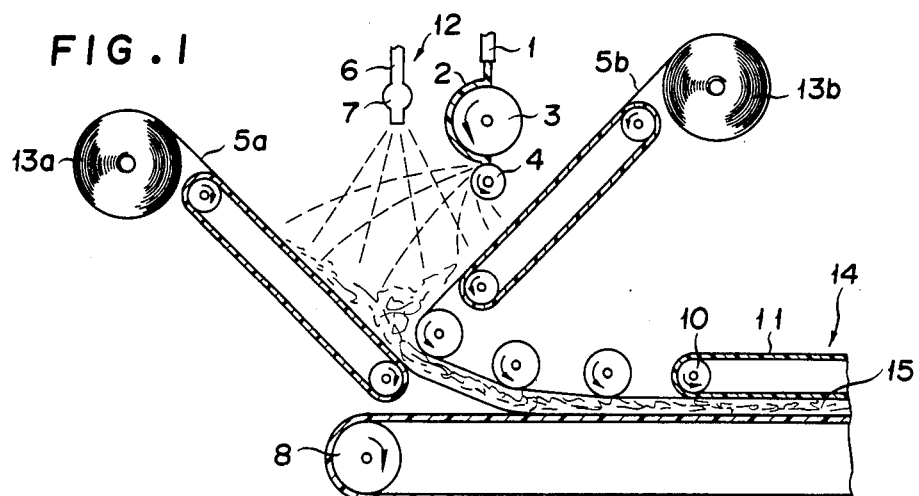
FIG. 1 is an explanatory diagram illustrating a typical method for manufacture of fiber reinforced thermosetting resin molding material as one embodiment of the present invention.

As the liquid thermosetting resin composition for use in the present invention, a mixture obtained by combining a radically polymeric resin such as unsaturated polyester resin or vinyl ester resin which is in a liquid state at room temperature with additives such as fillers, thickening agents, mold release agents, curing catalysts, coloring agents, low shrink additives, and ultraviolet light absorbers which are generally used in the art is adopted. The viscosity of the resin composition is required to fall in the range of 100 to 10,000 poise, preferably in the range of 400 to 3,000 poises.

The term "unsaturated polyester" as used in this invention is meant to refer to what is obtained by dissolving in a vinyl monomer such as styrene, vinyl toluene, or diallyl phthalate an unsaturated polyester which is a polycondensate between an acid moiety selected from among $\alpha$, $\beta$-unsaturated dibasic acids such as maleic anhydride and fumaric acid and/or anhydrides thereof and, optionally, saturated polybasic acids such as phthalic anhydride, tetrahydrophthalic anhydride, tetrachlorophthalic anhydride, and succinic anhydride and a polyhidric alcohol moiety selected from among ethylene glycol, diethylene glycol, propylene glycol, 1,3-butane diol, hydrogenated bisphenol A, etc. The term "vinyl ester resin" as used herein is meant to refer to what is obtained by dissolving in a vinyl monomer such as styrene, vinyl toluene, or diallyl phthalate a vinyl ester which results from the esterification, with acrylic acid or methacrylic acid, of a compound having at least two epoxy groups in the molecular unit thereof such as, for example, epoxy resin or a modified epoxy resin derived from bisphenol A, bisphenol F, brominated bisphenol A, phenyl novolak, brominated phenol novolak, or cresol novolak and epichlorohydrin and/or 2-methyl epichlorohydrin.

The reinforcing fibers to be used for the present invention may be inorganic fibers such as glass fibers or carbon fibers and organic fibers such as vinylon fibers or aramides fibers. The reinforcing fibers may be short fibers or continuous fibers.

As described above, the method for the manufacture of a fiber reinforced thermosetting resin molding material contemplated by the present invention comprises feeding a liquid thermosetting resin composition to the surface of at least one transfer roller in rotation, causing the resin composition adhering to the surface to be spread in the form of particles by a spreading roller opposed across a gap to the transfer roller, allowing the spread resin composition to be piled up in a state mixed with reinforcing fibers separately spread, and subsequently removing the entrapped air from the resultant pile thereby enabling the aforementioned resin composition to wet out the reinforcing fibers in the pile.

The spreading roller is adapted to be rotated at a high speed and, in the rotated state, brough into contact with the spread mass of resin composition being transported on the surface of the transfer roller so as to scrape the resin composition of the surface and, at the same time, send it flying in particles. To increase the relative peripheral speed of the two rollers, these two rollers are desired to be rotated in one and the same direction. For the spreading roller to acquire an increased peripheral speed, it is desired to have a smaller diameter than the transfer roller. Since the transfer roller serves to receive the resin composition fed to the surface thereof and convey it to the position of the spreading roller, its revolution number is relatively small, generally falling in the range of 100 to 1,000 r.p.m., preferably in the range of 200 to 400 r.p.m. Since the spreading roller is intended to scrape the resin composition off the surface of the trasfer roller, its revolution number is large, generally falling in the range of 3,000 to 10,000 r.p.m., preferably in the range of 5,000 to 7,000 r.p.m. For the present invention, provision of one spreading roller per transfer roller will suffice.

A reinforcing fibers' feeding device is intended to feed reinforcing fibers to the zone in which the resin composition is spread in the form of particles by the spreading roller, provision of one or two such feeding devices per one pair of transfer roller and a spreading roller or two pairs of the rollers per one feeding device will suffice for this invention.

The removal of air and wet out of the reinforcing fibers can be carried out by various methods. In the case of SMC, they may be accomplished by virtue of the pressure of rollers and, in the case of BMC, they may be attained by the pressure of hydraulic cylinder, for example.

Now, an embodiment of this invention by the use of unsaturated polyester resin as liquid thermosetting resin and glass fibers as reinforcing fibers will be described with reference to the accompanying drawing.

FIG. 1 is an explanatory diagram illustrating one embodiment of this invention. A liquid resin composition 2 obtained by thoroughly mixing unsaturated polyester resin with filler, mold release agent, coloring agent, thickening agent, curing catalyst, etc. is fed through a resin feed outlet 1 onto the surface of a transfer roller 3 being rotated at a revolution number in the range of 100 to 1,000 r.p.m. The resin composition 2 adhering to the surface of the transfer roller 3 is moved downwardly with the rotation of the transfer roller 3, scraped at the position at which the resin composition meets the surface of a spreading (scraping) roller 4 opposed across a minute gap to the transfer roller 3 and rotated at a high speed falling in the range of 3,000 to 10,000 r.p.m., and dispersed in the form of fine particles.

Figure 2A:
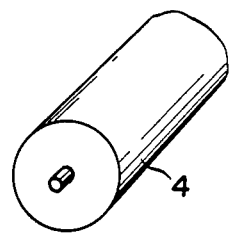
FIG. 2A to 2C are perspective views illustrating typical spreading rollers.
Figure 2B:
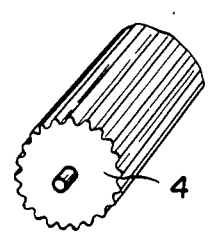
Figure 2C:
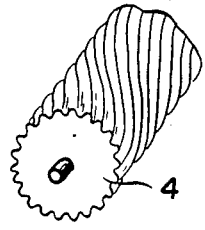

The spreading roller 4, by being rotated at a high speed, is enabled to generate a current of air near the surface of the roller. The current of air covers the surface of the roller as what may be called a protective film. The current of air, coupled with the centrifugal force generated by the high-speed rotation of the roller, causes the resin composition 2 carried on the transfer roller 3 to be spread in the form of particles onto plastic films 5a, 5b such as of polyethylene or polypropylene paid out of rolls 13a, 13b and driven by a conveyor belt 9 or a belt for removing air and wetting out 11, without being deposited appreciably on the spreading roller 4. For the resin composition 2 to be spread effectively, the transfer roller 3 and the spreading roller 4 are desired to have their surfaces coated with a film or layer of fluorine resin or silicone rubber which excels in mold releasing property. The spreading roller 4 which is rotated at a high speed may possess a smooth surface as illustrated in FIG. 2A. When this roller 4 has its surface corrugated with straight ridges and grooves or with helical ridges and grooves, it functions more effectively in the sense that it is capable of regulating the direction in which the resin composition is spread. The gap between the transfer roller 3 and the spreading roller 4 can be adjusted to suit the viscosity of the resin composition. It is generally not more than 2 mm, preferably in the range of 0.5 to 1.5 mm.

The glass fibers are fed from a fibers' feeding device 12. The fibers' feeding device 12 may be any of various devices known to the art. What is described below is one example. A glass roving 6 drawn out of a roll (not shown) is cut by a fiber cutter into sections of a fixed length and the resultant cut glass fibers are blown away with air. The cutter used herein comprises a cylindrical metallic roller having a glass fibers' cutting blade embedded circumferentially therein and a rubber roller adapted to be pressed fast against the roller. This metallic roller is driven with an electric motor or an air motor. This cutter is designed in a stationary structure when it is expected to have a long cutting length which is fit for spreading in the resin composition handled in the SMC plant. When the cutter is expected to have a short cutting length fit for spreading by the use of a spray-up device, it is adapted to be reciprocated at a desired constant speed in a direction perpendicular to the conveyor belt 9 in order for the cut glass fibers to be uniformly spread throughout the entire area in which the resin composition is spread.

The resin composition which has been spread in the form of particles by the spreading roller 4 is caused to mingle with the uniformly spread glass fibers and piled up on the plastic films 5a, 5b. The pile of the resin composition mixed with the glass fibers is retained between the two films and conveyed to a removing air and wetting out device 14 comprising a removing air and wetting out roller 10 and a belt 11. A fiber reinforced thermosetting resin molding material 15 resulting from the removing air and wetting out step is conveyed by a conveyor device 9 driven by a roller 8, taken out as shaped in the form of a sheet or plate, and put to storage in a rolled or folded form. The thickness of the molding material mentioned above is determined by the viscosity of the molding material 15 and the fixed pressure of the removing out and wetting out device.

Figure 3:
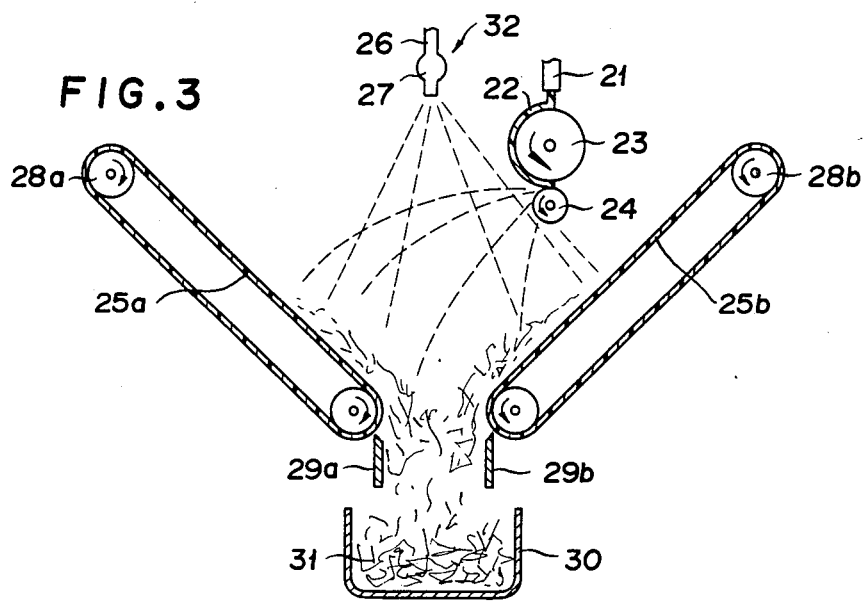
FIG. 3 is an explanatory diagram illustrating another embodiment of the present invention.

FIG. 3 illustrates another embodiment of the present invention. Similarly to the arrangement illustrated in FIG. 1, a liquid resin composition 22 is fed from a resin feeding outlet 21 onto the surface of a transfer roller 23. The resin composition 22 now adhering to the surface of the transfer roller 23 is moved downwardly with the rotation of the transfer roller 23, scraped off the transfer roller 23 where the resin composition 22 meets a spreading roller 24 opposed across a minute gap to the transfer roller 23 and operated at a high speed, and spread in the form of particles.

Separately, glass fibers are fed from a glass fibers' feeding device 32. For example, a glass roving 26 is cut by a glass fibers' cutter 27. The resultant cut glass fibers are blown away with air, piled on endless belts 25a, 25b driven respectively by rollers 28a, 28b, and brought into contact with and mixed with the particles of resin composition. The molding material piled on the afore-mentioned endless belts 25a, 25b is scraped down with scraping means 29a, 29b such as low-speed rotary brushes or knife edges and received in a fixed volume in a container 30. Then, the aforementioned container 30 is moved to a separate position, where the molding material 31 held inside the container 30 is pressed by a hydraulically operated cylinder. Consequently, the molding material is removed air and, at the same time, the glass fibers are wetted out with the resin composition to give rise to RMC. When all these steps are completed, the container 30 is tightly closed, packed, and shipped.

Figure 4:
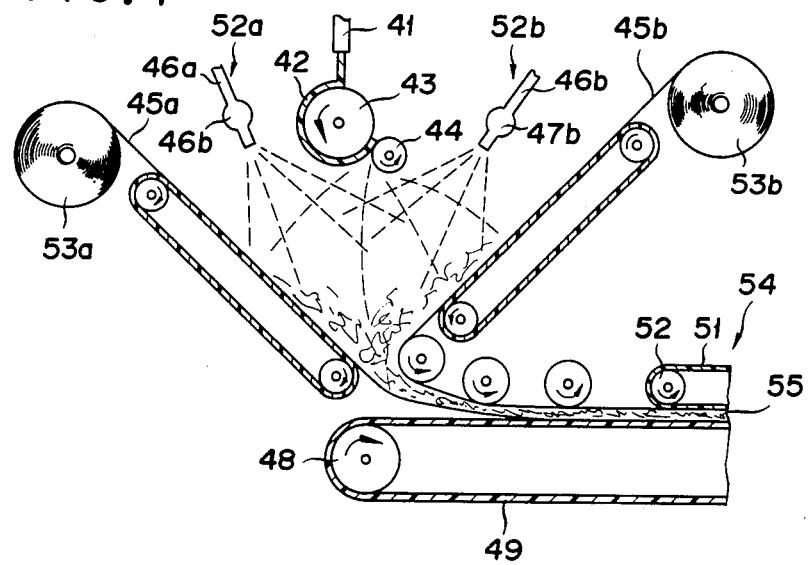
FIG. 4 is an explanatory diagram illustrating yet another embodiment of the present invention.

FIG. 4 illustrates still another embodiment of the present invention. This embodiment utilizes the same arrangement as the embodiment of FIG. 1, except that fibers' feeding devices 52a, 52b are disposed one each on the opposite sides of a pair of a transfer roller 43 and a spreading roller 44. In FIG. 4, the numerical symbols which are sums of the numerical symbols found in FIG. 1 plus 40 denote the same parts as those denoted by the corresponding numerical symbols of FIG. 1.

Figure 5:
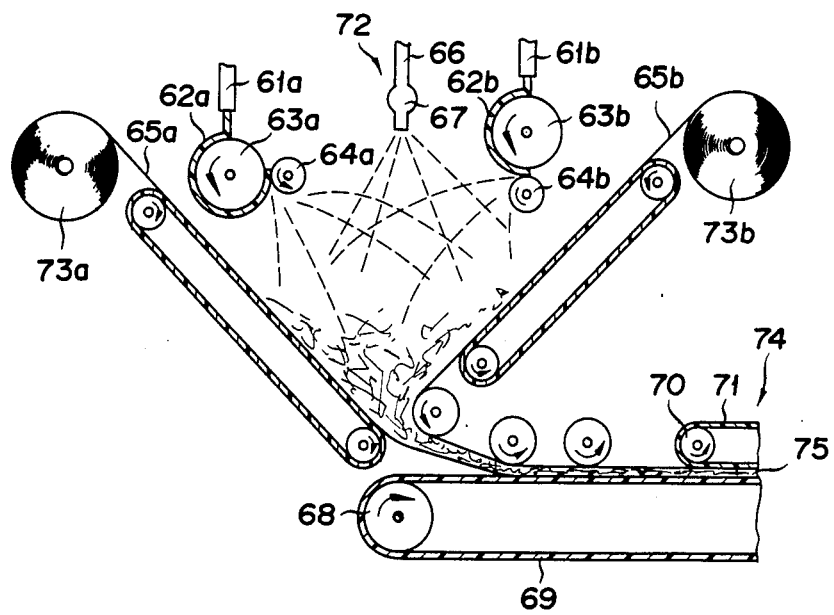
FIG. 5 is an explanatory diagram illustrating a further embodiment of the present invention.

FIG. 5 illustrates yet another embodiment of the present invention. This embodiment utilizes the same arrangement as the embodiment of FIG. 1, except that two pairs of transfer rollers 63a, 63b and spreading rollers 64a, 64b are disposed one each on the opposite sides of fibers' feeding device 72. In this case, one pair of rollers 63a, 64a and the other pair of rollers 63b, 64b are rotated in one and the same direction. In FIG. 5, the numerical symbols which are sums of the numerical symbols found in FIG. 1 plus 60 denote the same parts as those denoted by the corresponding numerical symbols of FIG. 1.

Figure 6:
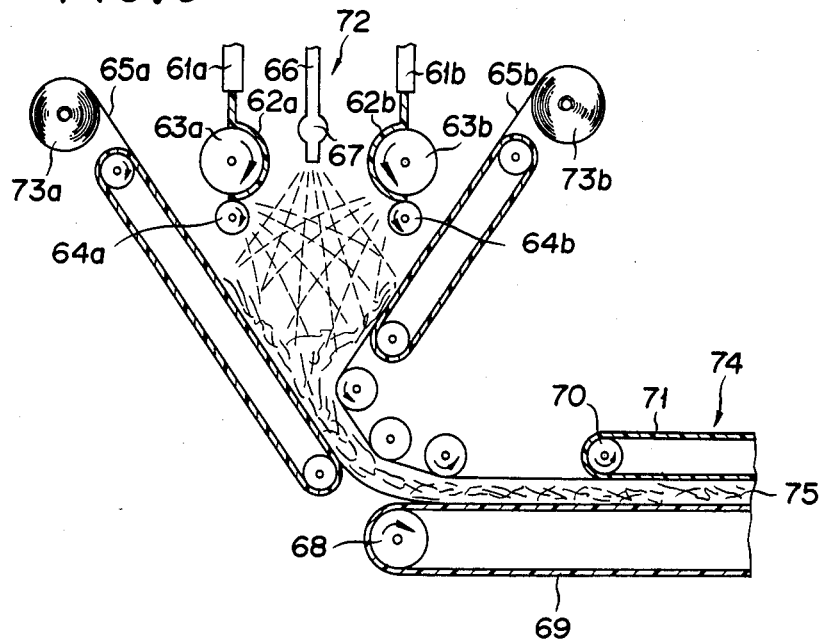
FIG. 6 is an explanatory illustrating still another embodiment of the present invention.

FIG. 6 illustrates a further embodiment of the present invention. This embodiment utilizes the same arrangement as the embodiment of FIG. 5, except that one pair of rollers 63a, 64a and the other pair of rollers 63b, 64b are rotated in mutually opposite directions.

Figure 7:
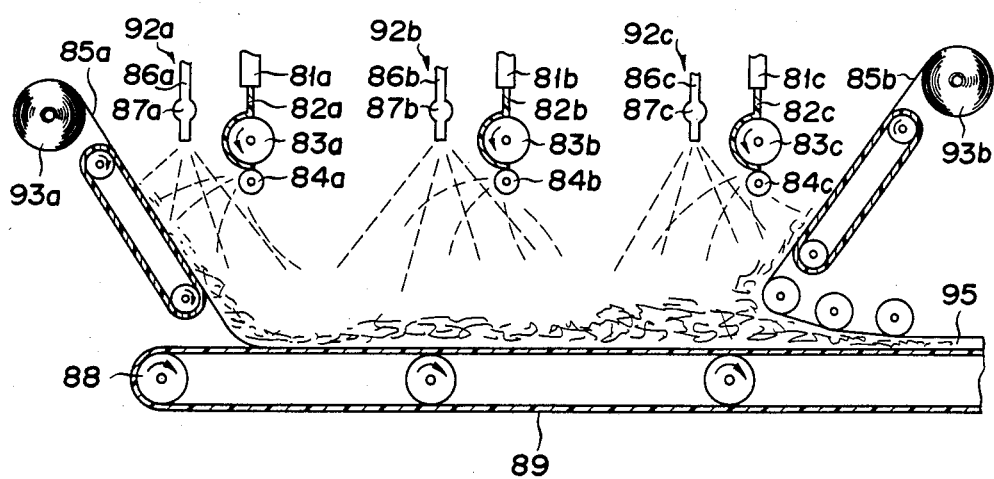
FIG. 7 is an explanatory illustrating another embodiment of the present invention.

FIG. 7 illustrate another embodiment of the present invention. This embodiment utilizes the same arrangement as the embodiment of FIG. 1, except that a glass fibers' feeding device 92a and a pair of rollers 83a, 84a are disposed in juxtaposition as one set, a glass fibers' feeding device 92b and a pair of rollers 83b, 84b similarly disposed as one set, and a glass fibers' feeding device 92c and a pair of rollers 83c, 84c similarly disposed as one set. This arrangement permits increase in productivity. When the number of unit sets is increased further, the entire system is simply increased in overall size without any basic change. In FIG. 7, the numerical symbols which are sums of the numerical symbols found in FIG. 1 plus 80 denote the same parts as those denoted by the corresponding numerical symbols of FIG. 1.

EXAMPLE 1

A liquid resin composition obtained by combining unsaturated polyester resin (produced by Nippon Shokubai kagaku Kogyo Co., Ltd. and marketed under trademark designation of "EPOLAC" N-21) and a varying set of additives incorporated in proportions indicated in Table 1 was treated by a method using an apparatus constructed as shown in FIG. 1 to produce a sheet of molding material (15 mm in thickness). In the apparatus, a transfer roller had a diameter of 200 mm and was operated at a rotational speed of 500 r.p.m. and a spreading roller had a diameter of 100 mm and was operated at a rotational speed of 4,000 r.p.m. The transfer roller and the spreading roller were separated by a gap of 1 mm. Glass fibers had a length of 0.5 inch. A flat shaped article obtained by pressing this molding material and a flat shaped article obtained by injection molding the molding material exhibited physical properties shown in Table 1.

EXAMPLE 2

A bulk of molding material was produced by following the procedure of Example 1, except that the resin composition was treated by a method using an apparatus constructed as shown in FIG. 3. The results are shown in Table 1.

EXAMPLE 3

A sheet of molding material (20 mm in thickness) was produced by following the procedure of Example 1, except that the resin composition was treated by a method using an apparatus constructed as shown in FIG. 6. The results are shown in Table 1.

CONTROL

A bulk of molding material was produced by the conventional method using components in a composition shown in Table 1. It was tested for physical properties. The results are shown in Table 1.

TABLE 1

|  | Control | Example 1 | Example 2 | Example 3 |
|---|---|---|---|---|
| Composition of molding material |  |  |  |  |
| Resin | 25.4% | 27.3% | 27.1% | 27.3% |
| Filler | 50.8 | 49.9 | 49.3 | 49.9 |
| Mold release agent | 1.27 | 1.06 | 1.23 | 1.06 |
| Curing agent | 0.30 | 0.27 | 0.29 | 0.27 |
| Coloring agent | 1.02 | 1.06 | 0.99 | 1.06 |
| Thickening agent | 0.17 | 0.15 | 0.16 | 0.15 |
| Other components | 2.03 | 0.26 | 1.97 | 0.26 |
| Glass fibers | 19.0 | 20.0 | 19.0 | 20.0 |
| Viscosity of resin composition (Poise) | 6340 | 1350 | 1830 | 1350 |
| Form of molding material | bulk | sheet (15 mm) | bulk | sheet (20 mm) |
| Strength of press molded article (plate) |  |  |  |  |
| Tensile strength (kg/mm$^2$) | 4.1 | 5.7 | 5.6 | 5.9 |
| Tensile modulus (kg/mm$^2$) | 1210 | 1140 | 1190 | 1180 |
| Bending strength (kg/mm$^2$) | 9.6 | 10.8 | 12.7 | 11.0 |
| Bending modulus (kg/mm$^2$) | 1060 | 990 | 1100 | 1060 |
| Impact strength (kg · cm/cm$^2$) (Izod flatwise) | 25.2 | 45.2 | 44.8 | 45.0 |
| Dispersion of impact strength in one lot (by Charpy impact test with U notch) (kg · cm/cm$^2$) | 17.8–33.6 | 48.2–57.0 | 35.7–42.6 | 45.3–55.6 |

In accordance with the present invention, a desired molding material can be produced without necessitating any appreciable alteration in the conventional BMC composition. The molding material produced by this invention shows conspicuous improvement in impact strength among other strength properties. Samples of molding material at varying stages of manufacture were burnt and the aggregates of glass fibers which remained after the burning were tested for injury. The glass fibers during the formation of molding material sustained no discernible injury. The glass fibers after molding of the molding material into a shaped article were found to sustain no appreciable injury.

In the case of samples collected in the manufacture by the conventional BMC process, even glass fibers during the formation of molding material were found to sustain injury conspicuously.

In accordance with the present invention, a fiber reinforced thermosetting resin molding material having reinforcing fibers easily and uniformly spread and wetted out with thermosetting resin without entailing infliction of injury can be produced easily as described above. The method of this invention enjoys the advantage that the shaped article made of the molding material exhibits enhanced strength properties of repressed dispersion.

What is claimed is:

1. A method for the manufacture of a fiber reinforced thermosetting resin molding material, which comprises feeding a liquid thermosetting resin composition having a viscosity of between 100 and 10K poise To the surface of at least one transfer roller in rotation, causing said resin composition adhering to said surface to be spread in the form of particles by a spreading roller opposed across a gap to said transfer roller and rotated in the same direction as said transfer roller, said resin being sprayed substantially in the direction of rotation of said spreading roller, blowing a stream of reinforcing fibers substantially thru said spray path of said resin whereby said fibers are coated with said resin, allowing said resin-fiber mixture of pileup, and subsequently removing the entrapped air from the resultant pile thereby enabling said resin composition to wet out said reinforcing fibers in said pile.

2. A method according to claim 1, wherein said spreading roll is operated at a revolution number greater than the revolution number of said transfer roller.

3. A method according to claim 2, wherein said spreading roller is in the range of 3,000 to 10,000 r.p.m. and that of said transfer roller is in the range of 100 to 1,000 r.p.m.

4. A method according to claim 2, wherein said spreading roller has a diameter smaller than the diameter of said transfer roller.

5. A method according to claim 1, wherein the surface of said spreading roller is flat and smooth.

6. A method according to claim 1, wherein the surface of said spreading roller has grooves formed therein.

7. A method according to claim 1, wherein the gap between the surface of said spreading roller and that of said transfer roller is not more than 2 mm.

8. A method according to claim 1, wherein said liquid thermosetting resin is unsaturated polyester resin and said reinforcing fibers are glass fibers.

9. A method according to claim 8, wherein said molding material is in the form of bulk molding compound.

10. A method according to claim 8, wherein said molding material is in the form of sheet molding compound.

11. A method according to claim 1, wherein transfer rollers and spreading rollers are used in a plurality of pairs.

* * * * *